United States Patent [19]
Graham et al.

[11] Patent Number: 5,160,053
[45] Date of Patent: Nov. 3, 1992

[54] ROTATING DISC SUPPORT RACK

[76] Inventors: Thomas S. Graham, 119 Richmond Cir., Pittsburgh, Pa. 15237; Todd R. McAliley, 2105 Straubs La., Pittsburgh, Pa. 15212

[21] Appl. No.: 694,941

[22] Filed: May 2, 1991

[51] Int. Cl.$^5$ ............................................. A47F 5/00
[52] U.S. Cl. .................................. 211/164; 312/267
[58] Field of Search ...................... 211/10, 11, 40, 41, 211/164, 58; 312/11, 135, 266, 267

[56] References Cited

U.S. PATENT DOCUMENTS

| | | | |
|---|---|---|---|
| 1,830,373 | 11/1931 | Schmidt | 211/164 |
| 2,743,982 | 5/1956 | Stingl | 312/267 |
| 3,038,773 | 6/1962 | Vasbinder | 211/164 X |
| 3,404,784 | 10/1968 | Scholfield | 211/164 |
| 4,303,283 | 12/1981 | Mueller | 312/135 |
| 5,039,180 | 8/1991 | Lemons | 312/267 |

Primary Examiner—Robert W. Gibson, Jr.
Attorney, Agent, or Firm—Leon Gilden

[57] ABSTRACT

A plurality of parallel racks are rotatably mounted about a common central axle, wherein the axle includes a matrix of right and left supports, the supports each include "L" shaped legs spaced apart ninety degrees relative to the central shaft, with each forward terminal end thereof mounting a positioning cone receivable within a recess within each end wall of each rack member of the support rack apparatus. A step motor is provided to effect ninety degree step rotation of the rack structure.

3 Claims, 4 Drawing Sheets

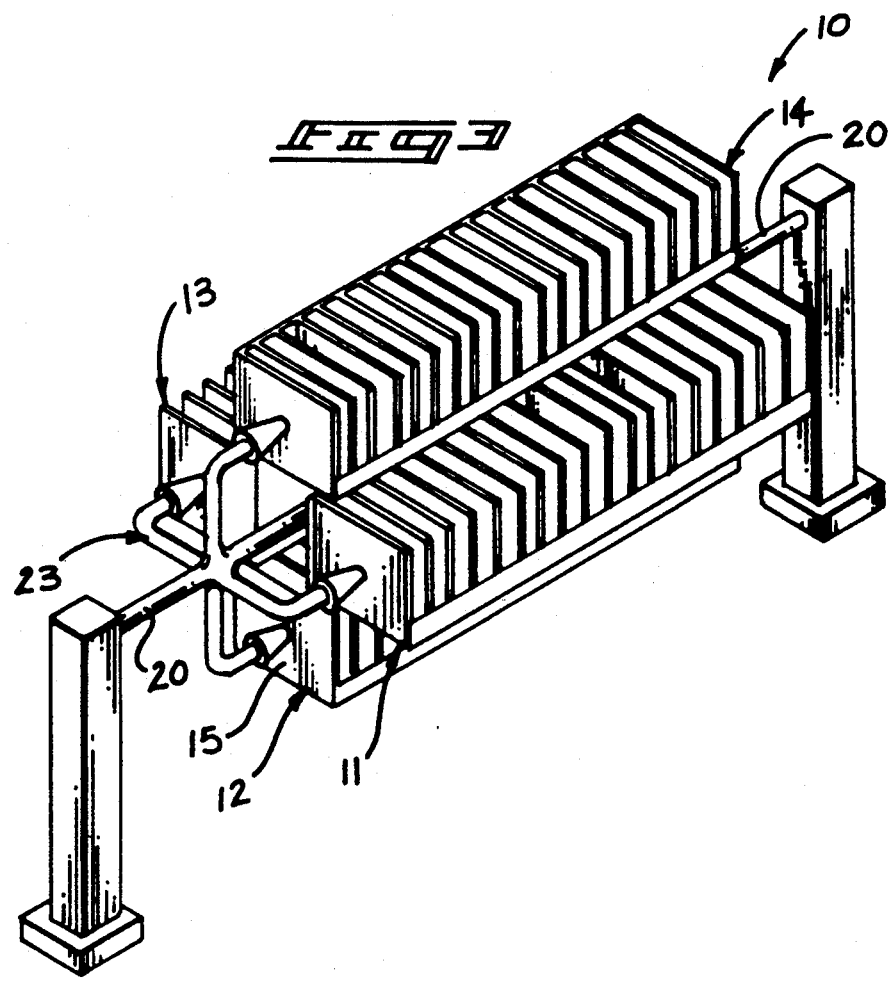
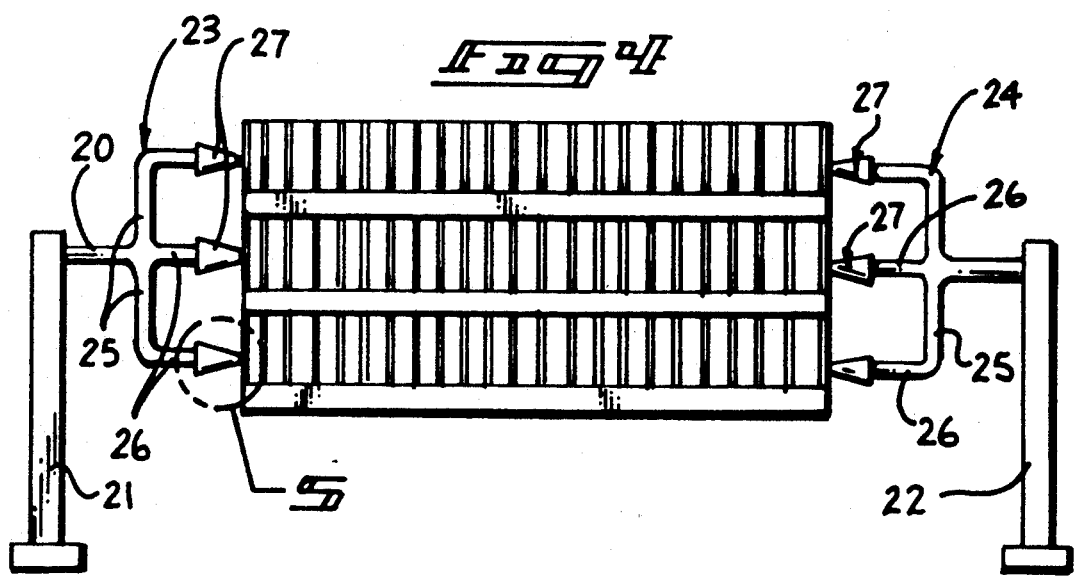

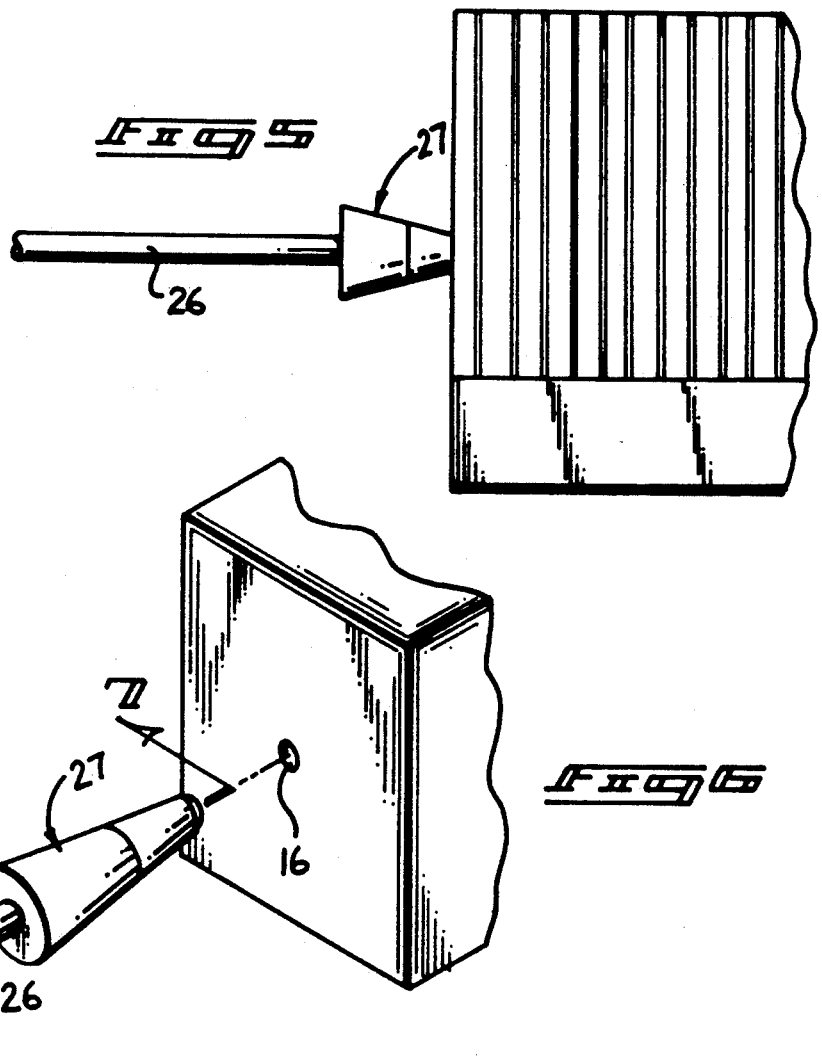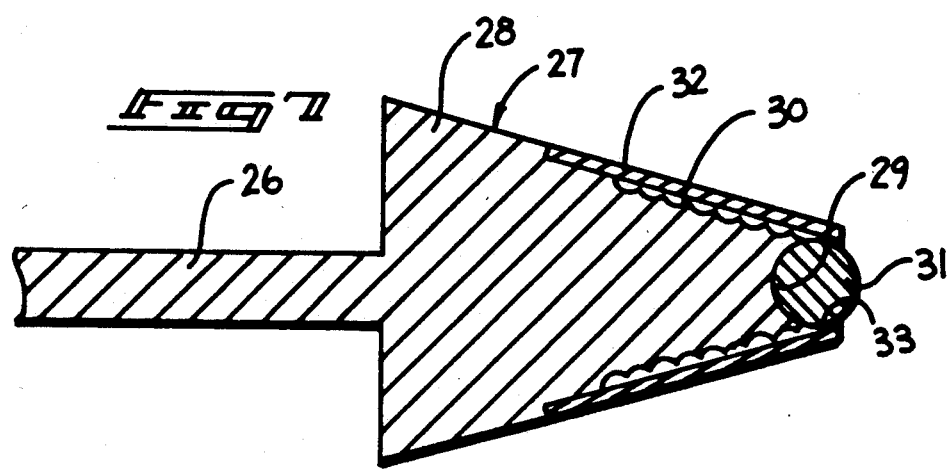

ROTATING DISC SUPPORT RACK

BACKGROUND OF THE INVENTION

1. Field of the Invention

The field of invention relates to compact disc support structure, and more particularly pertains to a new and improved rotating disc support rack to present one of a plurality of parallel racks for access by an individual to contents of each rack.

2. Description of the Prior Art

The advent of disc and tape support racks have been utilized in the prior art to provide access to the various disc containers which are typically of a relative thin dimension and whose orderly positioning is typically cumbersome. Prior art in this area may be found for example in U.S. Pat. No. 4,708,408 to Kennon wherein an organizer rack structure is rotatably mounted upon an underlying support rotatable about a vertical axis.

U.S. Pat. No. 4,807,749 to Ackert sets forth a container for securing a recording medium therewithin, wherein the rack structure is of a unitary construction housing a plurality of disc members therewithin.

U.S. Pat. No. 4,889,244 to Hehn, et al. sets forth a unitary support rack including a cavity to permit access of the cavity through a forward wall thereof by various compact discs and the like.

U.S. Pat. No. 4,819,802 sets forth a further example of an audio cassette holder utilizing spaced partitions to support compact discs therebetween.

As such, it may be appreciated that there continues to be a need for a new and improved rotating disc support rack as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of disc support apparatus now present in the prior art, the present invention provides a rotating disc support rack wherein the same is arranged for providing one of a plurality of parallel racks for presentation to a user thereof utilizing a step motor to rotate the racks ninety degrees relative to one another in a sequential manner. As such, the general purpose of the present invention, which will be described subsequently in greater detail, is to provide a new and improved rotating disc support rack which has all the advantages of the prior art disc support apparatus and none of the disadvantages.

To attain this, the present invention provides a plurality of parallel racks rotatably mounted about a common central axle, wherein the axle includes a matrix of right and left supports, the supports each include "L" shaped legs spaced apart ninety degrees relative to the central shaft, with each forward terminal end thereof mounting a positioning cone receivable within a recess within each end wall of each rack member of the support rack apparatus. A step motor is provided to effect ninety degree step rotation of the rack structure.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved rotating disc support rack which has all the advantages of the prior art disc support apparatus and none of the disadvantages.

It is another object of the present invention to provide a new and improved rotating disc support rack which may be easily and efficiently manufactured and marketed.

It is a further object of the present invention to provide a new and improved rotating disc support rack which is of a durable and reliable construction.

An even further object of the present invention is to provide a new and improved rotating disc support rack which is susceptible of a low cost of manufacture with regard to both materials and labor, and which accordingly is then susceptible of low prices of sale to the consuming public, thereby making such rotating disc support racks economically available to the buying public.

Still yet another object of the present invention is to provide a new and improved rotating disc support rack which provides in the apparatuses and methods of the prior art some of the advantages thereof, while simultaneously overcoming some of the disadvantages normally associated therewith.

Still another object of the present invention is to provide a new and improved rotating disc support rack wherein the same is arranged for visual presentation of individual support racks of a plurality of support racks for presentation to a user thereof.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an isometric illustration of the invention in an assembled configuration.

FIG. 4 is an orthographic frontal view, taken in elevation, of the instant invention.

FIG. 5 is an orthographic view of section 5 as set forth in FIG. 4.

FIG. 6 is an isometric illustration of the positioning cone positioned relative to the end wall recess of the instant invention.

FIG. 7 is an orthographic view, taken along the lines 7—7 of FIG. 6 in the direction indicated by the arrows.

DESCRIPTION OF THE PREFERRED EMBODIMENT

Figure 1:
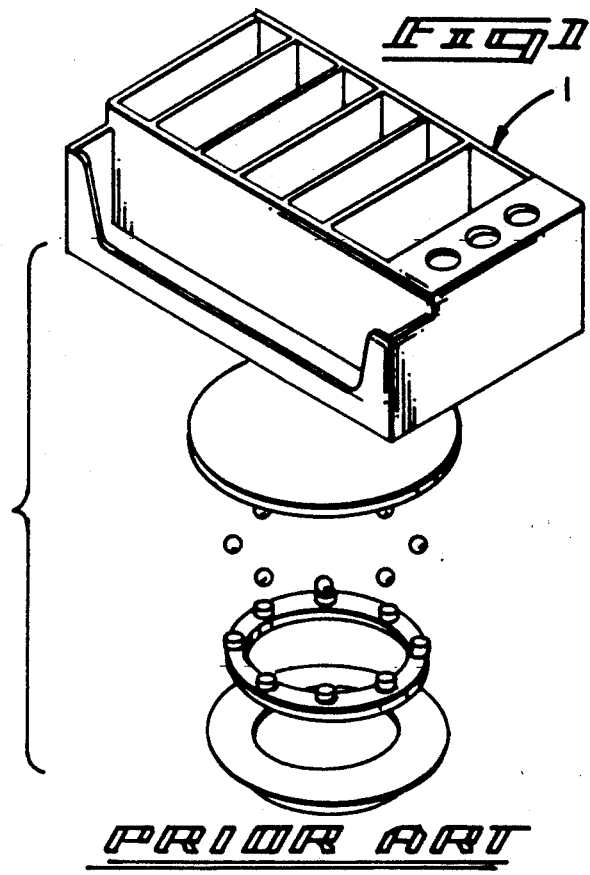
FIG. 1 is an isometric illustration of a prior art support rack apparatus.
Figure 2:
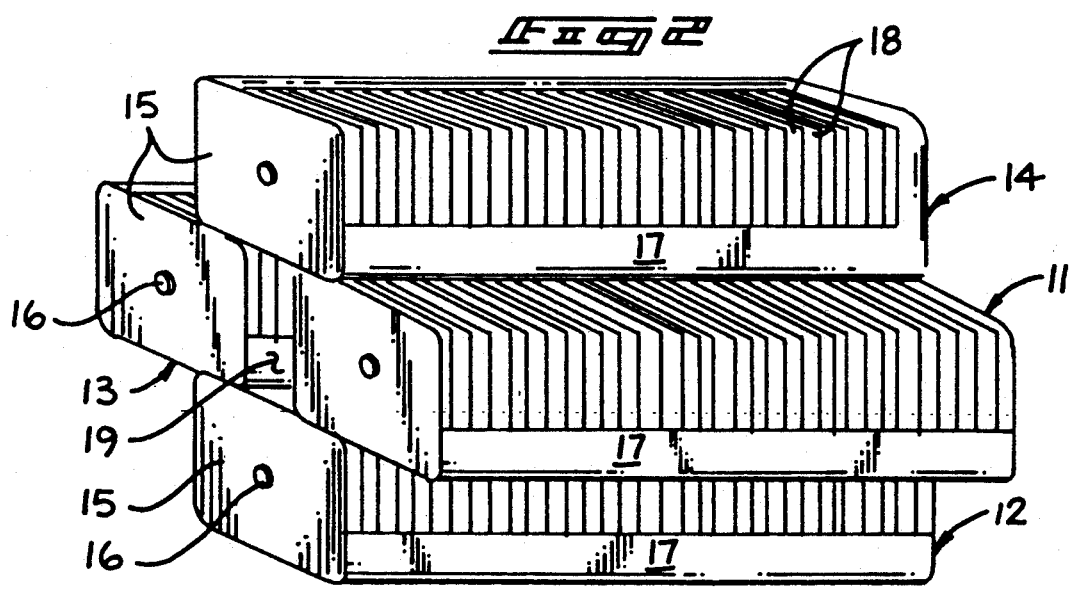
FIG. 2 is an isometric illustration of the rack members utilized by the instant invention.
Figure 8:
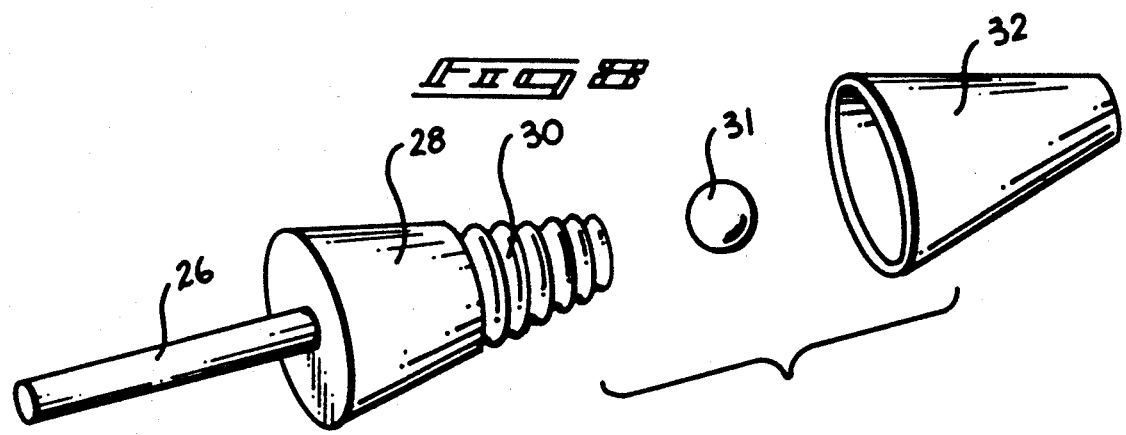
FIG. 8 is an isometric exploded illustration of the positioning cone structure utilized by the instant invention.
Figure 9:
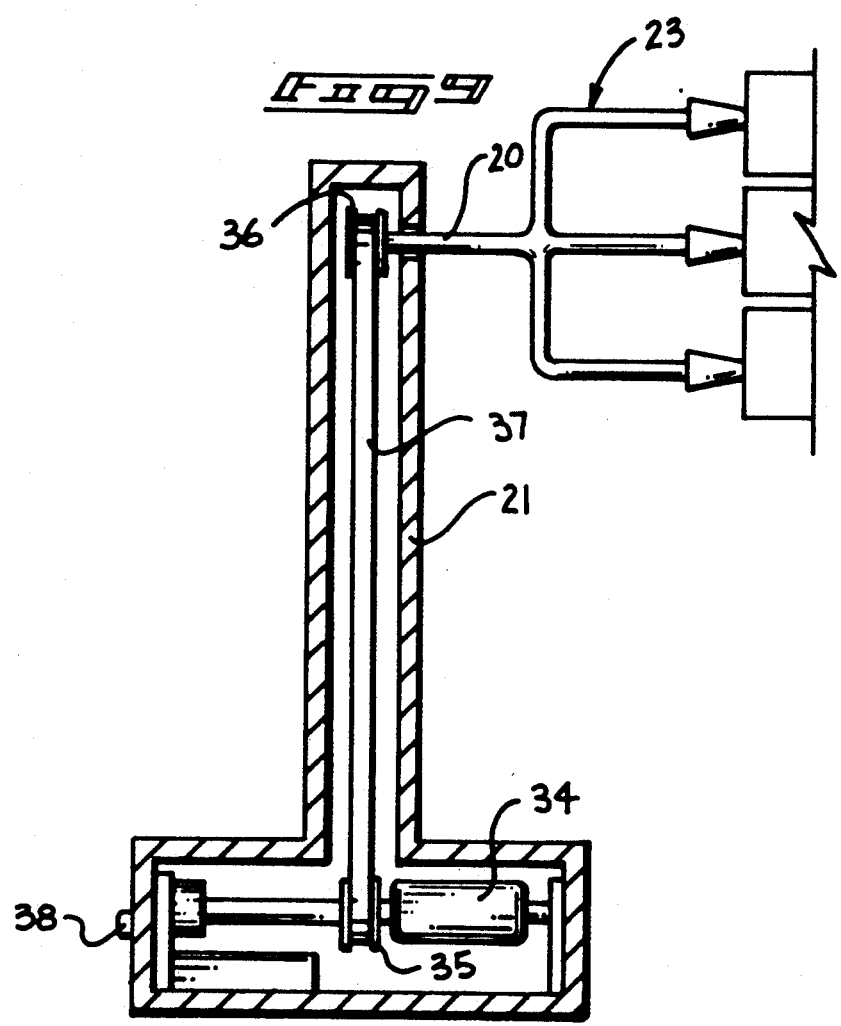
FIG. 9 is an orthographic side view, partially in section, of one of the support posts utilized by the instant invention.

With reference now to the drawings, and in particular to FIGS. 1 to 9 thereof, a new and improved rotating disc support rack embodying the principles and concepts of the present invention and generally designated by the reference numeral 10 will be described.

FIG. 1 illustrates a prior art support rack apparatus, as set forth in U.S. Pat. No. 4,708,408, wherein the rack structure is mounted upon an underlying rotary support plate organization permitting the rack to pivot about a vertical axis.

More specifically, the rotating disc support rack 10 of the instant invention essentially comprises a plurality of rack members defined by a respective first, second, third, and fourth rack member 11, 12, 13, and 14. Each of the rack members are of an identical configuration defined by planar end walls 15 of a first height, with a floor and side walls 17 defined by a second height less than the first height extending between opposed sides of the end walls 15. Each end wall 15 includes an end wall recess 16 positioned medially within each end wall. Arranged parallel at equal spacings between the end walls 15 are partition walls 18 defined by the first height. Further, directed through the rack members 11-14 is a spacing 19 to receive an axle shaft 20 therethrough. The axle shaft 20 is mounted rotatably at each of its ends to a respective right and left support post 21 and 22 that are orthogonally oriented relative to the axle shaft 20 that is horizontally oriented relative to the support post. Fixedly mounted to the axle shaft 20 in confronting relationship relative to one another on opposed sides of the rack members 11-14 are a respective right and left matrix support 23 and 24. Each of the matrix supports 23 and 24 are formed of "L" shaped legs 25 that are orthogonally oriented relative to the axle shaft 20 and spaced apart at ninety degree intervals. Each of the "L" shaped support legs 25 includes a horizontal support leg 26, wherein each of the support legs 26 of each matrix support are arranged parallel relative to one another, and with each horizontal support leg 26 including a positioning cone 27 formed at a forward terminal end of each of the horizontal support legs 26, with each positioning cone coaxially mounted at the forward terminal end of each horizontal support leg. Each positioning cone 27 includes a fixed truncated conical end member 28 that is coaxially mounted to the forward terminal end of the horizontal support leg 26 of each "L" shaped support leg 25, with each fixed truncated conical end member 28 including a semi-spherical forward terminal end 29 receiving a spherical support member 31 therewithin. A helical lubricant groove 30 is directed from a position medially of the outer surface of each conical end member 28 in communication with each semi-spherical forward terminal end 29. A conical sleeve 32 is securable about each forward portion of each fixed truncated conical end member 28, wherein the conical sleeve is positioned to overlie the helical lubricant groove 30 and the semi-spherical forward terminal end 29. The conical sleeve 32 is defined by a sleeve opening 33 at its forward end of a diameter less than the diameter of a spherical support member 31. The spherical support member 31 is accordingly received within the end wall recess 16. In this manner, lubricant contained within the helical lubricant groove 30 directs lubricant upon rotation of the organization to the spherical support member 31 to maintain lubrication of the spherical support member 31 and its positioning within the end wall 16.

The right support post 21 is illustrated as utilized with a drive step motor 34, including an output shaft mounted to a lower pulley 35 coaxially thereof utilizing a drive belt 37 directed about a lower pulley 35 through an upper pulley 36. The upper pulley 36 is mounted coaxially of the axle shaft 20 to effect selective rotation of the axle shaft and the rack members 11 upon actuation of an actuation switch 38 to effect rotation of the drive step motor and the associated axle shaft 20 at ninety degree intervals.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A rotating disc support rack, comprising in combination, a plurality of rack members, wherein the plurality of rack members includes a first, second, third, and fourth respective rack member, each rack member arranged parallel and coextensively relative to one another, with the rack members defining a tunnel spacing between the rack members in an assembled configuration, and each rack member including spaced planar end walls defined by a first height, a floor coextensively directed between the end walls, and side walls positioned on each side of the end walls defined by a second height less than the first height, and a plurality of partition walls spaced apart a predetermined spacing and defined by the first height to accommodate audio disc members between the partition walls, and an axle shaft directed through the tunnel spacing, and a respective right and left support post rotatably mounting respective right and left terminal ends of the axle shaft, and the axle shaft including a respective right and left matrix support fixedly mounted to the axle shaft, with the right and left matrix supports in confronting relationship relative to one another, and are each directed to secure opposed end walls of the plurality off rack members between the right and left matrix supports, and each matrix support includes a plurality of "L" shaped support legs, and each "L" shaped support leg is orthogonally and fixedly mounted to the axle shaft spaced apart at ninety degree intervals relative to an adjacent "L" shaped support leg, and each "L" shaped support leg includes a horizontal support leg, each of a predetermined length, and each horizontal support leg is parallel relative to one another, and each horizontal support leg including a fixed truncated conical end member fixedly and coaxially mounted to a forward terminal end of each horizontal support leg, and each fixed truncated conical end member includes a spherical forward terminal end, and each spherical forward terminal end rotatably mounts a spherical support member therewithin, and each spherical support member and spherical forward terminal end includes a helical lubricant groove directed about the fixed truncated conical end member, and each fixed truncated conical end member further includes a conical sleeve positioned in surrounding relationship relative to the helical lubricant groove and the spherical support member and the semispherical forward terminal end, and each end wall includes an end wall recess medially directed within each end wall of each rack member, and each spherical support member is rotatably mounted within each end wall recess.

2. An apparatus as set forth in claim 1 wherein each conical sleeve includes a conical sleeve opening at a forward end thereof, wherein each conical sleeve opening is defined by a first diameter and each spherical support member is defined by a second diameter, wherein the second diameter is greater than the first diameter.

3. An apparatus as set forth in claim 2 wherein the right support post includes an upper pulley positioned therewithin, wherein the upper pulley coaxially receives the axle shaft therethrough, and the right support post further includes a lower pulley, with a drive belt in communication with the lower pulley and the upper pulley, and further including a drive step motor, the drive step motor including an output shaft, the output shaft coaxially directed through the lower pulley, and switch means to effect selective rotation of the output shaft of the drive step motor to effect ninety degree rotation of the axle shaft.

* * * * *